United States Patent
Moschella

(10) Patent No.: US 12,300,222 B2
(45) Date of Patent: May 13, 2025

(54) VOICE-BASED WORD RECOGNITION SYSTEMS

(71) Applicant: Joseph Moschella, Los Angeles, CA (US)

(72) Inventor: Joseph Moschella, Los Angeles, CA (US)

(73) Assignee: Numbers Fourteen Eight, LLC, Los Angeles, CA (US)

( * ) Notice: Subject to any disclaimer, the term of this patent is extended or adjusted under 35 U.S.C. 154(b) by 313 days.

(21) Appl. No.: 17/833,693

(22) Filed: Jun. 6, 2022

(65) Prior Publication Data

US 2022/0392437 A1      Dec. 8, 2022

Related U.S. Application Data

(60) Provisional application No. 63/208,424, filed on Jun. 8, 2021.

(51) Int. Cl.
| | |
|---|---|
| *G10L 15/08* | (2006.01) |
| *G06F 3/04817* | (2022.01) |
| *G06F 3/0482* | (2013.01) |
| *G06F 3/0484* | (2022.01) |
| *G10L 15/22* | (2006.01) |

(52) U.S. Cl.
CPC .......... *G10L 15/08* (2013.01); *G06F 3/04817* (2013.01); *G06F 3/0482* (2013.01); *G06F 3/0484* (2013.01); *G10L 15/22* (2013.01); *G10L 2015/088* (2013.01)

(58) Field of Classification Search
USPC .......................... 704/246, 247, 251, 252, 275
See application file for complete search history.

(56) References Cited

U.S. PATENT DOCUMENTS

| | | | |
|---|---|---|---|
| 10,440,063 B1* | 10/2019 | Nevick | H04N 21/222 |
| 2010/0280828 A1* | 11/2010 | Fein | G10L 15/1822 |
| | | | 704/E15.005 |
| 2014/0129225 A1* | 5/2014 | Nair | H04L 51/063 |
| | | | 704/E15.04 |
| 2015/0070516 A1* | 3/2015 | Shoemake | H04N 21/4542 |
| | | | 348/207.11 |
| 2016/0224540 A1* | 8/2016 | Stewart | G06F 40/232 |
| 2016/0294753 A1* | 10/2016 | Centner | H04L 51/212 |

* cited by examiner

*Primary Examiner* — Leonard Saint-Cyr
(74) *Attorney, Agent, or Firm* — Rutan & Tucker LLP; Hani Z. Sayed

(57) ABSTRACT

A voice-based word recognition device, system, and methods are provided for detecting and selectively modifying offensive words. The voice-based word recognition system may be used to monitor and receive signal data from an input/output source. The system may include a voice-based word detector configured to identify a potentially offensive word or phrase from the received signal data. The system may be implemented to analyze whether the identified potentially offensive word or phrase matches an offensive word or phrase from a list of predetermined words. The system may then generate alert data in response to the identified potentially offensive word or phrase matching the offensive word or phrase. As such, the system may therefore modify the matched offensive word or phrase in response to the generated alert data, such that the matched offensive word or phrase is thereby modified prior to audio output data being generated and transmitted to external users.

7 Claims, 9 Drawing Sheets

VOICE-BASED WORD RECOGNITION SYSTEMS

PRIORITY

This application claims the benefit of and priority to U.S. Provisional Application, entitled "Voice-Based Word Recognition Systems," filed on Jun. 8, 2021, and having application Ser. No. 63/208,424, the entirety of said application being incorporated herein by reference.

FIELD

The embodiments of the present disclosure generally relate to a word recognition system. More specifically, the embodiments relate to a voice-based recognition system for identifying and potentially modifying one or more specified spoken offensive words.

BACKGROUND

Many users, viewers, and listeners of multimedia and other similar programs typically desire to filter portions of the audio signals being transmitted by such programs. Generally, in various circumstances, many users (e.g., parents, teachers, employers, etc.) may prohibit (e.g., children, students, employees, etc.) from streaming movies, listening to audio podcasts, watching videos available in online video sharing platforms, participating in online classes, webinars, and chats available in cloud-based peer-to-peer video conferencing platform, and/or other programs due to the audio associated with those programs. Such audio may include inappropriate language, offensive words such as profanity words, swear words, curse words, and/or insulting words, and any other verbal words unsuitable, offensive, and/or culturally inappropriate for age-restricted users and any other users.

Furthermore, in circumstance where a presenting/reviewing user has not seen a particular program, such user may not know whether the audio content of that particular program is inappropriate for a particular viewing/listening audience. As such, that user may inadvertently present/transmit that particular program to that particular audience without knowing whether portions of it are inappropriate. For example, a university professor may be virtually interacting with students and "presenting live" via a teleconferencing software platform (e.g., Zoom, Skype, FaceTime, etc.), where the professor or student may say something wrong during the "live presentation" without having the capabilities being able to catch those words/phrases from being transmitted "live" to the students. In an effort to solve this dilemma, these systems are "go or no-go" systems, as discussed above. Either the entire program (or words/phrases) is deemed appropriate and let through, or inappropriate and blocked depending on the rating. There is no capability in such systems for allowing the user to listen in order to replace objectionable material (audio or video) with less-objectionable material, such as, e.g., modified audio signals capable of muting, bleeping, blocking, amending, etc., only those specific inappropriate/objectional material.

Furthermore, many existing systems used to filter some form of audio-video content require specialized hardware and/or additional components to perform the replacement function, such as audio-video devices having dedicated circuitry, components, and/or chip sets. While these systems are able to block content deemed to be objectionable by the user, the implementation of the filtering function is dependent on inclusion of the required hardware into the audio-video device. Such necessary hardware increases the cost of such equipment, makes upgrading or updating to improve functionality and/or to add features difficult and, in most cases, impossible, and severely limits widespread adoption and use.

While such existing systems generally provide effective filtering processes for offensive words identified in closed-captioning streams, these filtering processes typically involve utilizing an estimated time period (e.g., known as a "profanity delay") to filter of the audio signal is typically based on and may result in audio that is not objectionable being blocked or audio that is objectionable getting through. Plus, the system does not provide the capability of replacing objectionable material with less-objectionable material, such as, modified material with detected words/phrases that have been modified, censored, and/or replaced from the original audio data. Therefore, notwithstanding the existing systems and methods, there is a need for a system, method, and computing device (or computer program product) that enables the detection of specified words and the selective modification of offensive (or objectional) multimedia material.

Embodiments described in the disclosure below provide a word recognition system for detecting and selectively modifying a word or phrase (e.g., an offensive word) spoken by a user.

SUMMARY

A voice-based word recognition device, system, and related methods are provided for detecting and selectively modifying offensive words and any other predetermined words. The voice-based word recognition system may be used to monitor and receive signal data from an input/output source. The system may include a voice-based word detector configured to identify a potentially offensive word or phrase from the received signal data. The system may be implemented to analyze whether the identified potentially offensive word or phrase matches an offensive word or phrase from a list of predetermined words. The system may then generate alert data in response to the identified potentially offensive word or phrase matching the offensive word or phrase. As such, the system may therefore modify the matched offensive word or phrase in response to the generated alert data, such that the matched offensive word or phrase is thereby modified prior to audio output data being generated and transmitted to external users.

In an exemplary embodiment, a voice-based word recognition system for detecting and selectively modifying offensive words spoken by users comprises an input/output (I/O) source, processors communicatively coupled to the I/O source, and a memory communicatively coupled to the processors. In another exemplary embodiment, the voice-based word recognition system may provide a monitoring logic configured to receive signal data from the I/O source, and a word detector logic configured to identify a potentially offensive word or phrase from the received signal data. Furthermore, in several other exemplary embodiments, the voice-based word recognition system may provide an analyzer logic configured to determine whether the identified potentially offensive word or phrase matches an offensive word or phrase from a list of predetermined words, and an alert logic configured to generate alert data in response to the identified potentially offensive word or phrase matching the offensive word or phrase from the list of predetermined words.

In another exemplary embodiment, the voice-based word recognition system may provide that the signal data comprises audio data captured with the I/O source, where the captured audio data may be associated with one or more words or phrases spoken by one or more users. In another exemplary embodiment, the I/O source comprises at least one or more of an audio I/O device, a pair of earphones, a smart hearable, a dictation device, a head-mounted visual and audio display, a gaming console, a mobile computing device, a computing tablet, and/or a voice-based speaker. In some exemplary embodiments, the list of predetermined words may be generated based on one or more sources, where the sources comprise at least one or more of a system administrator, a third-party provider, an entity, a service, and the one or more users.

In another exemplary embodiment, the voice-based word recognition system may further provide that the generated list of predetermined words comprises at least one or more of a set of offensive words, a set of proprietary words, a set of inappropriate words, a set of age-restricted words, and/or a set of flagged words. In another exemplary embodiment, the generated list of predetermined words is implemented with a word recognition dialog box, where the word recognition dialog box may be configured to display an abridged wordlist window and a plurality of controls. The displayed controls may be configured to enable the one or more users to administer the generated list of predetermined words, where the displayed controls may comprise an add button, a delete icon, a protection switch, and a settings button. For example, in another exemplary embodiment, the add button may be configured to insert one or more new words to the generated list of predetermined words, the abridged wordlist window may be configured to display a recent list of the one or more inserted new words, and the delete icon may be configured to remove one or more outdated words from the generated list of predetermined words. Whereas, in another exemplary embodiment, the protection switch may be configured to allow the one or more users to switch the voice-based word recognition system between an ON state and an OFF state.

In another exemplary embodiment, the voice-based word recognition system may provide that the settings button is configured to display a settings dialog box. In another exemplary embodiment, the settings dialog box comprises an extended wordlist window, a search box, an import button, and an export button. In another exemplary embodiment, the extended wordlist window may be configured to display each word available in the generated list of predetermined words, while the search box may be similarly configured to locate one or more words in the generated list of predetermined words. Moreover, in several exemplary embodiments, the import button may be configured to import a first string of specified offensive words from a first external source to supplement the generated list of predetermined words, whereas the export button may be configured to generate a second string of specified offensive words from the generated list of predetermined words and to transmit the generated second string of specified offensive words to a second external source. Furthermore, in another exemplary embodiment in response to the generated alert data, the alert logic may be configured to trigger one or more autonomous response actions based on the matched offensive word or phrase from the generated list of predetermined words (e.g., those triggered response actions may include displaying a warning dialog box, temporarily blocking any incoming data, autonomously modifying and/or censoring certain specified words/phrases, etc.).

In another exemplary embodiment, the voice-based word recognition system may further comprise a user interface logic configured to provide a plurality of word recognition tools and customizable prompts used to facilitate the one or more users with administering the generated list of predetermined word. For example, in another exemplary embodiment, the user interface logic may be configured to cooperate with the alert logic to display a warning dialog box in response to the one or more triggered autonomous response actions. In other exemplary embodiments, the displayed warning dialog box may be configured to prevent the matched offensive word or phrase from being generated and transmitted as audio output data. Meanwhile, in another exemplary embodiment, the displayed warning dialog box may be configured to display a warning message in conjunction with one or more actionable buttons relating to the matched offensive word or phrase, such that the displayed actionable buttons provide prompts to the users to select between: (i) a NO button configured to acknowledge and proceed in light of the displayed warning message, and/or (ii) a YES button configured to modify the matched offensive word or phrase prior to generating and transmitting the audio output data.

In another exemplary embodiment, the voice-based word recognition system further comprises at least one or more of a modification logic, a machine learning logic, and/or a report logic. In another exemplary embodiment, the modification logic configured to modify the matched offensive word or phrase in response to the users selecting the YES button in the displayed warning dialog box, such that the matched offensive word or phrase is thereby modified in the generated audio output data being transmitted to one or more external users. In another exemplary embodiment, the modified offensive word or phrase may be implemented by: (i) the matched offensive word or phrase being muted from the generated audio output data, (ii) the matched offensive word or phrase being bleeped out from the generated audio output data, and/or (iii) the matched offensive word or phrase being replaced from the generated audio output data with an analogous non-offensive word or phrase.

In an exemplary embodiment, the machine learning logic may be configured to cooperate with one or more of the word detector logic, the analyzer logic, and the alert logic to generate supplemental analysis data based on any of the modified offensive words/phrases, the matched offensive words/phrases, the words/phrases spoken by users, and/or any other similar analysis-related data. As such, in some exemplary embodiments, the generated supplemental analysis data may thereby be used to train machine learning data (or models, etc.) in conjunction with enhancing any other related data. For example, in an exemplary embodiment, the trained machine learning data may be used to better (or more-accurately) identify data from the captured audio data and to better generate alert data and modify data based on any past selections, modifications, feedback, and/or any other similar trained instances (e.g., to generate enhanced built-in word suggestions for any identified offensive words/phrases). In an exemplary embodiment, the report logic may be configured to generate a customizable report relating to any of the detected and selectively modified offensive words spoken by the users.

These and other features of the concepts provided herein may be better understood with reference to the drawings, description, and appended claims.

BRIEF DESCRIPTION OF THE DRAWINGS

The drawings refer to embodiments of the present disclosure in which.

Figure 1:
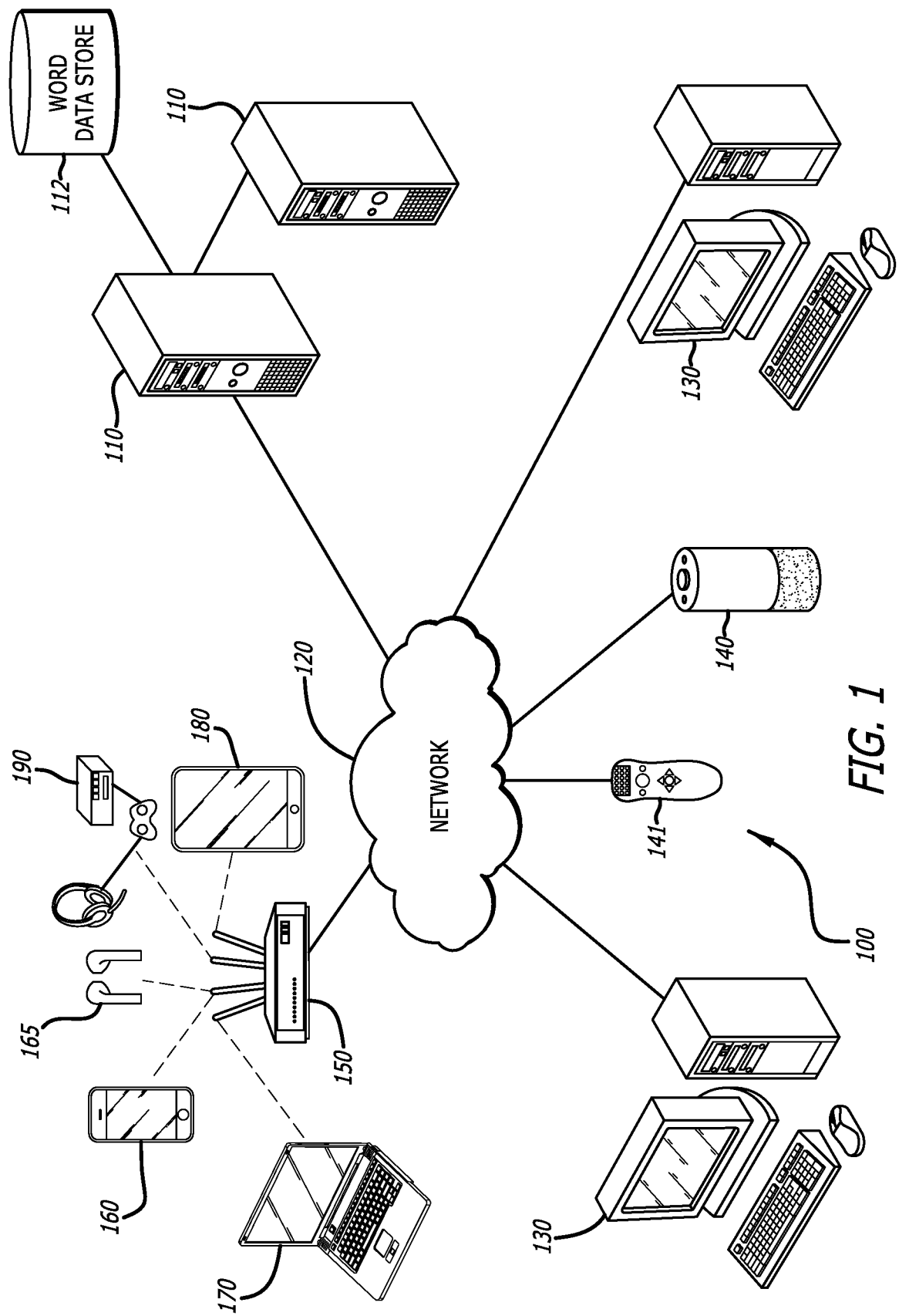
FIG. 1 is an exemplary block illustration of a word recognition system, in accordance with embodiments of the present disclosure.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first window," may be made. However, the specific numeric reference should not be interpreted as a literal sequential order but rather interpreted that the "first window" is different than a "second window." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Embodiments of voice-based word recognition systems are provided below for detecting and selectively modifying predetermined spoken words and/or phrases in a word recognition computing environment. For example, these embodiments described herein may be integrated at various levels of the voice-based word recognition computing environment, including, but not limited to, an app-level integration, an operating service-level integration, and/or any other similar level(s) of integration capable of implemented all the built-in functionalities, services, and so on, as described below in greater detail. The voice-based word recognition system may be used to monitor and receive signal data from an input/output source. The system may include a voice-based word detector configured to identify a potentially offensive word or phrase from the received signal data. The system may be implemented to analyze whether the identified potentially offensive word or phrase matches an offensive word or phrase from a list of predetermined words. The system may then generate alert data in response to the identified potentially offensive word or phrase matching the offensive word or phrase. As such, the system may therefore modify the matched offensive word or phrase in response to the generated alert data, such that the matched offensive word or phrase is thereby modified prior to audio output data being generated and transmitted to external users.

As described in greater detail below, these embodiments may be implemented to enable users (e.g., end-users, reviewing users, sound engineers, teachers, administrations, parents, etc.) to selectively modify any detected offensive words instantaneously—and on the fly, substantially in real-time, and/or during a substantially "live" communication (e.g., during a live streaming video, a real-time tele-education presentation, and so on). For example, when a university professor is "presenting live" with students via a tele-conferencing-based platform, these embodiments may be used to prevent the professor and/or student(s) from saying something inappropriate using a software program described herein that is running in conjunction with the platform on a very slight predetermined delay to identify, filter, and/or alter those inappropriate terms before they go out live to the respective viewers. As such, in the example above, a flag (e.g., a warning dialog box) may be triggered in response to those inappropriate terms (or phrases), where the subsequent response (or action) to the triggered flag may be manually predetermined and/or automated (e.g., the "live presentation" or lecture may continue with the sound of the word elided and/or the like). Furthermore, the embodiments discussed below also include machine learning models and processes, which are capable of substantially reducing the overall word detection time frame and modification time frames, such that any of the trained machine learning models/processes described herein are capable of reducing the existing broadcasting delay (or the "profanity delay") practiced during most real-time or "live" communications.

Referring now to FIG. 1, an exemplary block illustration of a word recognition system 100 is shown, in accordance with embodiments of the disclosure. As described in greater detail below, the word recognition system 100 (also referred to as a voice-based word recognition system) may include a plurality of communicative computing devices configured to: (i) capture voice-based signal inputs with at least one of the communicative computing devices, (ii) identify/analyze offensive words/phrases from the captured signal inputs, and (iii) generate modified voice-based signal outputs based on the identified/analyzed offensive words/phrases. For example, the modified audio output data may be generated to modify (or censor, amend, replace, block, etc.) the detected offensive words/phrases, such that the detected offensive words/phrases are thereby modified prior to the generated audio output data being transmitted to external users. Such examples of the modified audio data may include having the detected and selectively modified offensive words muted, bleeped out, blocked, and so on.

As shown in FIG. 1, the illustrated word recognition system 100 may include voice-based word recognition servers 110 with associated word data store(s) 112, a network 120, personal computing devices 130, audio devices 140-141, and various mobile computing devices 150, 160, 165, 170, 180, and 190. In many embodiments, the voice-based word recognition servers 110 are connected to the network 120 such as, for example, the Internet. These voice-based word recognition servers 110 may be configured to transmit a variety of data across the network 120 to any number of computing devices such as, but not limited to, the personal computers 130, the personal listening devices 140-141, and the various illustrated mobile computing devices including laptop computers 170, cellular phones 160, portable tablet computers 180, smart audio devise 165, and gaming consoles 190. In additional embodiments, the voice-based word recognition data may be mirrored in additional cloud-based service provider servers, edge network systems, and/or the like. In still additional embodiments, the voice-based word recognition servers 110 may be hosted as virtual servers within a cloud-based service.

In further embodiments, the sending and receiving of voice-based word recognition data may occur over the network 120 through wired and/or wireless connections. In the illustrated embodiments depicted in FIG. 1, the mobile computing devices 160, 165, 170, 180, and 190 are connected wirelessly to the network 120 via a wireless network access point 150. It should be understood that the types of wired and/or wireless connections between devices on the word recognition system 100 (or any of the voice-based word recognition systems depicted below) may be comprised of any combination of devices and connections as needed, without limitations.

In various embodiments, the voice-based word recognition system 100 may broadly accept voice-based journal entry from users via any number of personal computers 130, personal listening computing devices 140-141, and/or mobile computing devices 160, 165, 170, 180, and 190. These voice-based word recognition system 100 may detect and selectively modify offensive words spoken by end users associated with one or more of the illustrated computing devices. For example, the generated modified audio output data transmitted over the network 120 may be customized, managed, and/or implemented from a list of predetermined words implemented within the personal computers 130, personal listening computing devices 140-141, and/or mobile computing devices 160, 165, 170, 180, and 190. In still further embodiments, the end-users associated with any of illustrated devices in FIG. 1 may subsequently generate feedback data that can be transmitted back to, for example, the voice-based word recognition servers 110 that may utilize the feedback data to further improve the modeling of various machine learning algorithms utilized to generate better word detections, modifications, suggestions, and so on.

Figure 2:
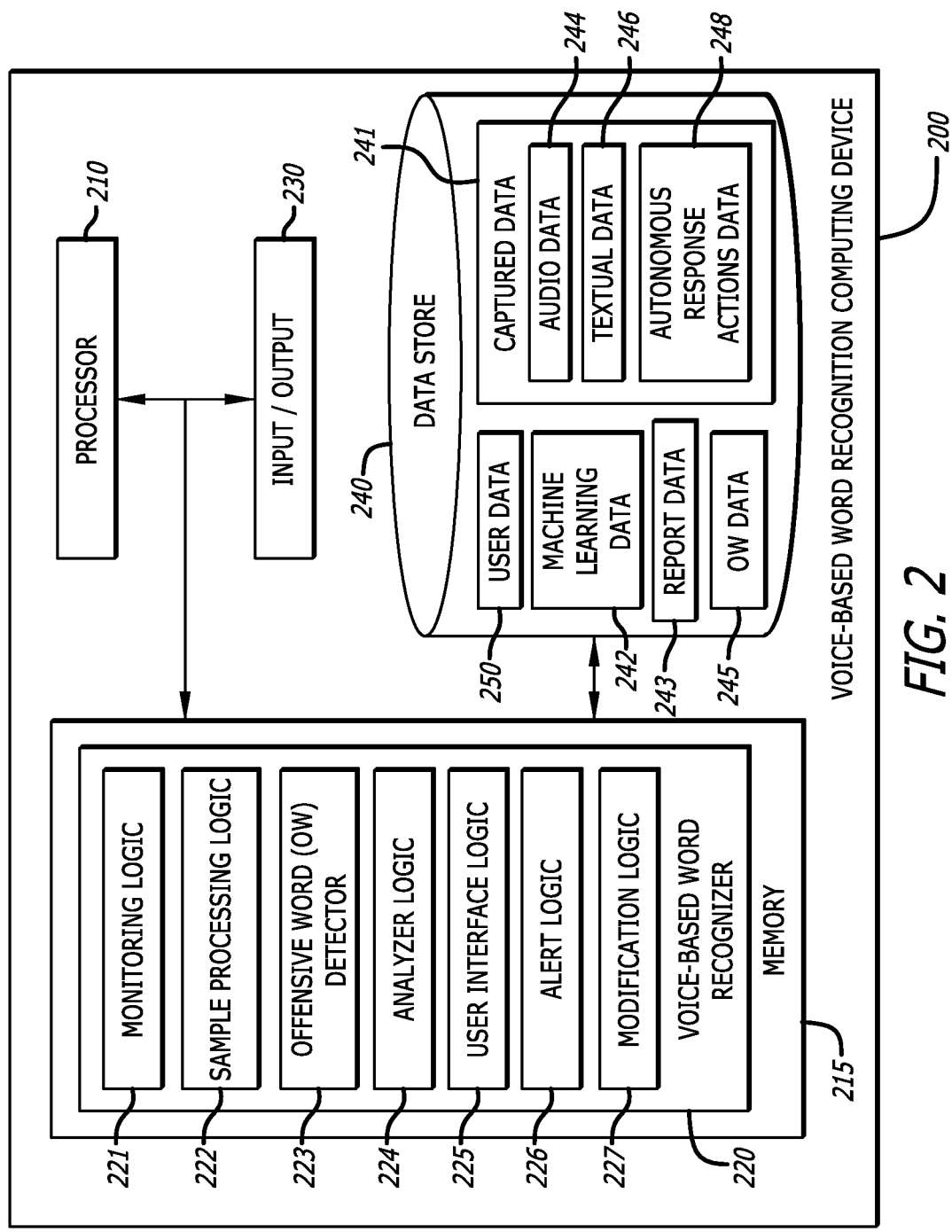
FIG. 2 is an abstract block illustration of a voice-based word recognition computing device, in accordance with embodiments of the present disclosure.

Referring now to FIG. 2, an exemplary block illustration of a voice-based word recognition computing device 200 is shown, in accordance with embodiments of the disclosure. In many embodiments, the voice-based word recognition device 200 may include one or more processors 210, a memory 215 with a voice-based word recognition application 220 (or voice-based word detector/recognizer), an input/output 230, and a data store 240. The voice-based word recognition device 200 depicted in FIG. 2 may be implemented similar to several components depicted above in FIG. 1, such as the voice-based word recognition server 110 and the personal computing device(s) 130 depicted in FIG. 1.

For example, the voice-based word recognition device 200 may be implemented by the word recognition system 100 in conjunction with any other additional devices, servers, and/or systems depicted in FIG. 1, such as, but not limited to, one or more of the personal/mobile computing devices. In some embodiments, the voice-based word recognition device 200 may be any computing device that may implement a voice-based word recognition system process, such as the one or more processes described herein including the previously-discussed processes depicted above in FIG. 1. As noted, the computing devices may include any of the personal and/or mobile computing devices depicted in FIG. 1, and/or may comprise any computing device sufficient to receive, transmit, and respond to any voice-based word recognition entry/signal captured from the respective end-users.

In various embodiments, the voice-based word recognition device 200 may be configured to detect and selectively modify any words spoken by the respective users, where the detected words are based on a list of predetermined words, stored for example in the offensive word data 245 in the data store 240. In many embodiments, the voice-based word recognition device 200 may detect and selectively modify these predetermined by implementing one or more logics within a voice-based word recognizer/detector/identifier application 220 to receive audio signal data from any I/O sources, identify offensive words from the received/processed audio data, and analyze whether any predetermined (or specified) offensive words match the identified offensive words from a list of predetermined words.

As illustrated in FIG. 2A, the memory 215 may comprise the voice-based word recognition application 220 which may further comprise monitoring logic 221, sample processing logic 222, offensive word (OW) detector logic 223, analyzer logic 224, interface logic 225, alert logic 226, and modification logic 227. The data store 240 may include user data 250, machine learning data 242, report data 243, OWA data 245, and captured data 241 having audio data 244, textual data 246, and autonomous response action data 248.

In a number of embodiments, the monitoring logic 221 may be configured to receive and transmit data between the illustrated device 200 and any external computing devices, such as the personal computing device 130 and/or voice-based word recognition server 110 depicted in FIG. 1, and/or the like. For example, the data received by the monitoring logic 221 may be stored as the captured data 241 within the user data 250, where the captured data 241 may include any type of data captured and received by the monitoring logic 221. For example, the signal input data received by the monitoring logic 221 with the respective I/O source(s) (e.g., such as microphones, audio data sources, sensors, etc.) may be stored as one or more of the audio data 244 and/or textual data 246 within the captured data 241 of the user data 250, where the audio data 244 may include any type of signal data such as audio data, audio signal streams, audio waveform samples, etc. In some embodiments, the monitoring logic 221 may establish communication channels with the external computing devices via a network connection similar to the network 120 depicted in FIG. 1. Certain embodiments may utilize network connection tools provided by the operating system of the voice-based word recognition computing device 200.

In many embodiments, the sample processing logic 222 may be configured to receive, process, and transmit any data related to the captured data 241 with regard to the audio data 244—as well as any textual data 246—received by the monitoring logic 221. In many embodiments, the sample processing logic 222 may be configured as a filter bank or the like that may be used to receive, for example, the captured signal data 244, where the received data of the sample processing logic 222 may be filtered and pre-processed based on the desired actionable decisions prior to feeding such data to the sample processing logic 222. That is, in some embodiments, the sample processing logic 222 may be configured as an enhancement filter (or the like) that may be configured to suppress undesired noise in a signal by selectively attenuating or boosting certain components of the signal on a time-varying basis, and/or by suppressing undesired noise in the signal by selectively attenuating or boosting certain components of the signal on the time-varying basis.

In many embodiments, the sample processing logic 222 may receive the signals audio data 244 and may be in conjunction with the OW detector 223, which is configured to receive audio data and subsequently perform word recognition tasks, such as intensifying characteristics from the received audio input data and so on. For example, as described herein, the analyzer logic 224 may be configured to identify offensive words and/or identify characteristics, keywords, and similarities with regard to potential offensive words from the received audio data 244. In some embodiments, the sample processing logic 222 in conjunction with the OW detector logic 223 may be configured to ultimately transmit any identified offensive words—and/or any identified data with regard to potential offensive words—to the user interface logic 225 based on the result(s) aggregated from the performed word recognition tasks of one and/or both the sample processing logic 222 and OW detector 223. In addition, as described in further detail below, the analyzer logic 224 may have access to one or more data types within the data store 240, which may include one or more lists of predetermined words stored within the OW data 245, user data associated with any end users of the illustrated computing device 200 stored within user data 250, identified analysis data trained and stored within the machine learning data 242, and/or predetermined response actions associated with the alert logic 226 and stored within the autonomous response actions data 248.

In most embodiments, the analyzer logic 224 facilitates the processing and analyzing the OW data 245 associated with any of the identified/detected offensive words captured with the captured data 241. Many embodiments of the analyzer logic 224 may obtain the OW data 245 and process it to provide/generate data related to, for example, any of the alert, modifications, report, machine learning, and autonomous response action data (or data point) stored in the data store 240, which may be subsequently used to ultimate generate the alert and modified data. In further embodiments, the analyzer logic 224 may be particular configured to determine whether any (offensive word or phrase (or potential offensive words) identified by the OW detector 223 matches an offensive word or phrase from the predetermined words stored in the OW data 245. The analyzer logic 224 may also utilize user data 250, machine learning data 242, report data 243, and/or OW data 245 to support the processing and analyzing of the captured data 241 in view of the respective words stored in the OW data 245.

In a variety of embodiments, the user interface logic 225 may interact with any of the illustrated logics to provide a user with one or more tools and/or prompts to facilitate in detecting and selectively modifying offensive words and so on. In many embodiments, the user interface logic 225 may generate one or more graphical or audio user interfaces (e.g., such as the warning dialog boxes depicted below in FIGS. 5A-C) to provide methods for users to navigate through the voice-based word recognition systems and processes. For example, the user interface logic 225 may provide these warning dialog boxes containing warning messages and prompts displayed to the respective user, where such prompts may be configured as actionable buttons to allow the users to select between:(i) a NO button configured to acknowledge and proceed in light of the displayed warning message, or (ii) a YES button configured to modify the matched offensive word or phrase prior to generating and transmitting the audio output data.

Now, in many exemplary embodiments, the alert logic 226 may be configured to generate alert data in response to the analyzer logic 224 having matched the potentially offensive word or phrase with the offensive word or phrase from the list of predetermined words located in the OW data 245. In most embodiments, the generated alert data from the alert logic 226 may be stored in the report data 243, where the report data 243 may be used to accumulate all of the generated alerts that may then be used to view various types of reports based on all the accumulated alert data in conjunction with any other available data and data points in the data store 240. Additionally, the alert logic 226 may be configured, in response to the generated alert data, to trigger one or more autonomous response actions from the autonomous responsive actions data 248 (e.g., displaying the warning dialog boxes, messages, and prompts indicating the detected offensive words) in relation to, for example, the matched offensive words/phrases from the generated list of predetermined words and so on.

Lastly, in accordance with many embodiments, the modification logic 227 may configured to modify the matched offensive word or phrase in response to the respective user selecting, e.g., the YES button in the displayed warning dialog box, such that the matched offensive word or phrase is thereby modified in the generated audio output data being transmitted to one or more external users. For example, the modification logic 227 may be configured to provide modified offensive word or phrase comprising of: (i) the matched offensive word or phrase being muted from the generated audio output data, (ii) the matched offensive word or phrase being bleeped out from the generated audio output data, and/or (iii) the matched offensive word or phrase being replaced from the generated audio output data with an analogous non-offensive word or phrase—and/or any other desired modification. Moreover, in some embodiments, the modification logic 227 may be configured to be automated, where the sound of the modified offensive word or phrase may be elided and/or the like. In addition, as described in greater detail below, the machine learning data 242 may be associated with the modification logic 227 and any other illustrated logics, where the machine learning data 242 may thus build generated supplemental analysis data based on the modified offensive word or phrase, the matched offensive word or phrase, and the words or phrases spoken by users. For example, the generated supplemental analysis data stored in the machine learning data 242 may be utilized to train machine learning data to better identify data within the captured audio data 241 in conjunction with better modify data based on past selections, modifications, and user feedback.

Figure 3A:
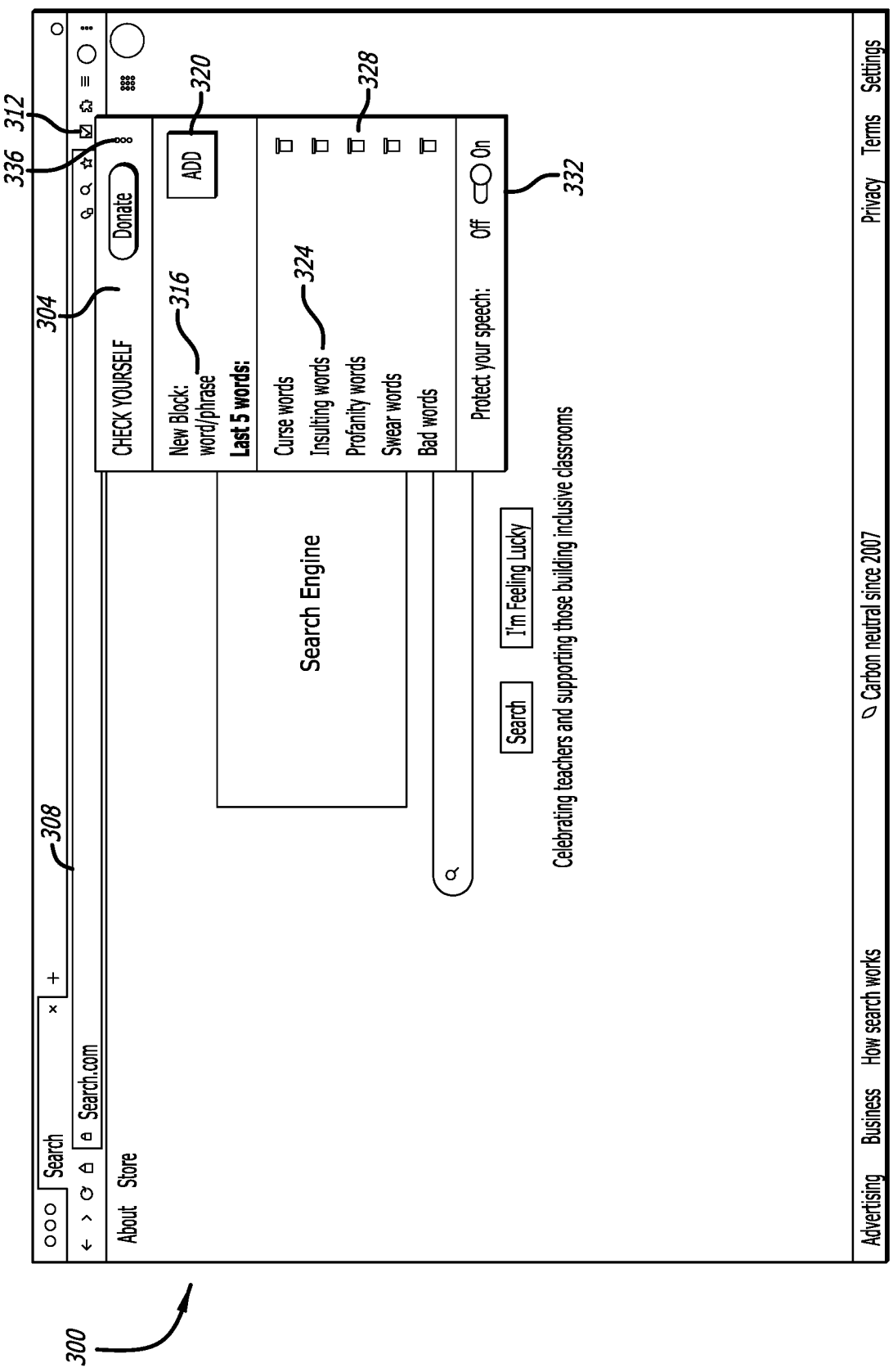
FIG. 3A is an exemplary screenshot illustration of a word recognition system dialog box displayed in a browser application, in accordance with embodiments of the present disclosure.
Figure 3B:
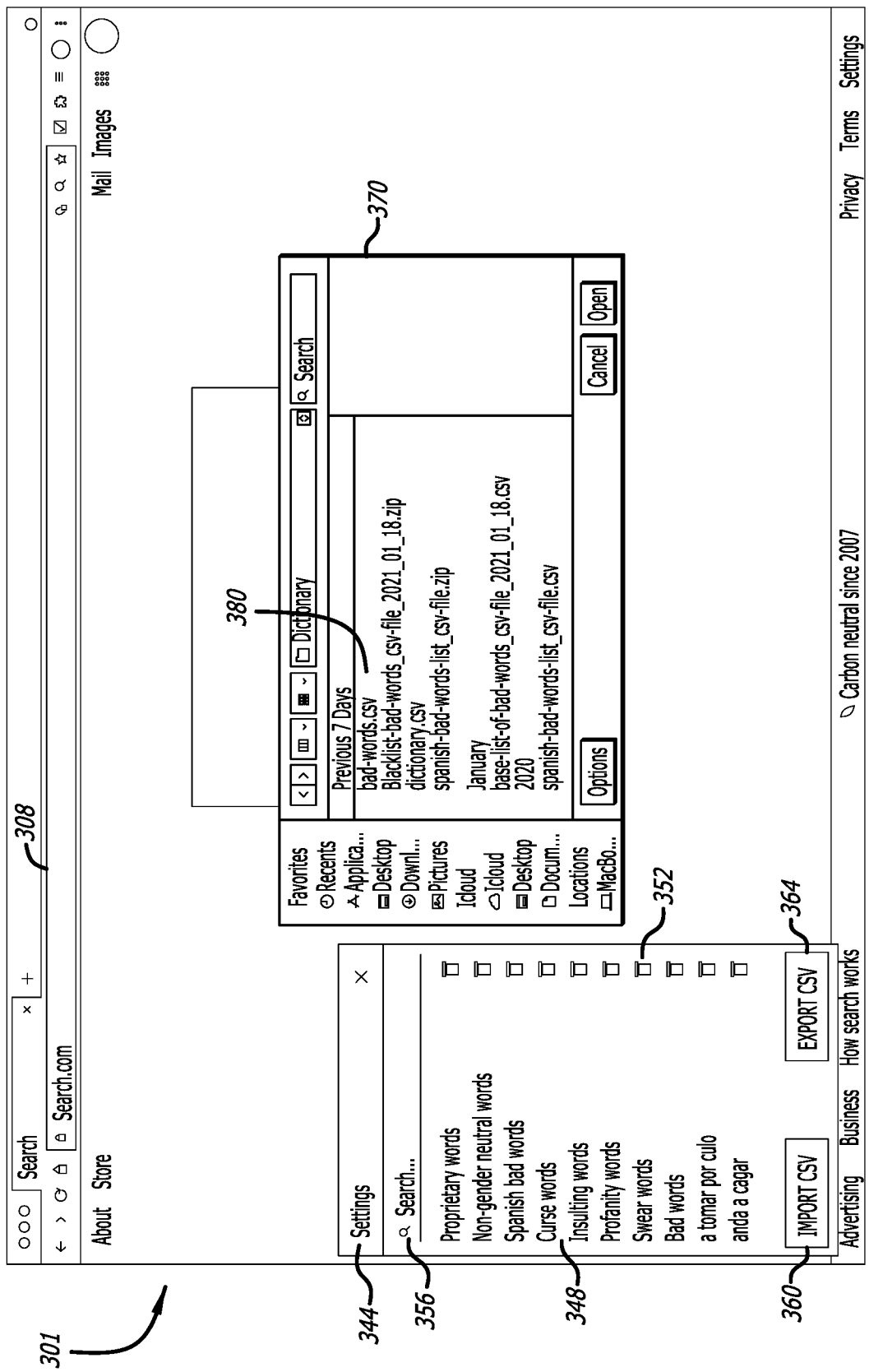
FIG. 3B is an exemplary screenshot illustration of a settings dialog box displayed in a browser application, in accordance with embodiments of the present disclosure.

Referring now to FIGS. 3A-B, a series of exemplary screenshot 300-301 illustrations of a browser application 308 is shown, in accordance with embodiments of the disclosure. It should be understood that the illustrated screenshots 300-301 depicted in FIGS. 3A-B may be implemented with any of the voice-based recognition server 110 depicted in FIG. 1, the personal computing device 130 depicted in FIG. 1, and/or the voice-based recognition computing device 200 depicted in FIG. 2, without limitations. Also, although one or more illustrated components are explicitly depicted in FIGS. 2A-B, it should be understood that the exemplary screenshots 300-301 depicted in FIGS. 3A-B are not limited those illustrated components and may include more or less components capable of being implemented in any word recognition system described herein (e.g., the recognition system 100 of FIG. 1), without limitations.

In many embodiments, as shown in FIG. 3A, a first screenshot 300 may be configured to display a recognition system dialog box 304 displayed in the browser application 308. In the illustrated embodiment, the browser application 308 may be a Google Chrome browser application. In some embodiments, the voice-based word recognition systems described herein may be implemented as a browser action that may be installed as a part of the browser application 308. As such, a browser action icon 312 may be displayed in the main toolbar, to the right of the address bar, as shown in FIG. 3A. In some embodiments, the browser action icon 312 may be displayed in any of various other suitable locations of the browser application 308. Further, the browser action may be associated with a tooltip and a badge, as desired. Moreover, the illustrated word extension/recognition system may be associated with one or more background elements that are configured to provide functionality for the operation of the voice-based word recognition systems.

In these illustrated embodiments, the first screenshot may be configured to display the recognition system dialog box 304 in response to (or when/if) an end-user selecting the browser action icon 312, such as by clicking with a mouse and/or the like. The recognition system dialog box 304 may be populated with content as specified by the voice-based word recognition system as well as instructions contained in the one or more background elements. In general, the illustrated recognition system dialog box 304 enables end-users to manage a list of predetermined words that are to be detected, blocked, and/or selectively modified from being spoken and transmitted via the browser application 308.

For example, as illustrated in FIG. 3A, the recognition system dialog box 304 may include, but is not limited to, a new word text box 316, an add button 320, a saved words list 324, and a delete button 328 associated with each word in the saved words list 324. The new word text box 316 may be configured to allow the end-user to type one or more new words to be detected/modified from being spoken and transmitted via the browser application 308. The add button 320 enables the end-user to include any of the words typed in the new word text box 316 to the saved words list 324. As will be appreciated, the saved words list 324 may include, but is not limited to, a listing of the most recently added words and phrases to be detected and modified in the browser application 308. The illustrated delete button 328 may be associated with each word or phrase in the saved words list 324. The end-user may remove any unwanted word or phrase from the saved words list 324 by selecting the delete button 328 associated with the unwanted word or phrase.

With continuing reference to FIG. 3A, the illustrated recognition system dialog box 304 may further include a protection switch 332 and a settings button 336. The protection switch 332 may be configured to allow the end-user to toggle the respective voice-based word recognition system between an OFF state and an ON state. While in the On state, the voice-based word recognition system may be configured to actively identify, analyze, and alert any word or phrase that has been spoken and/or received as signal data via the browser application 308 with the words and phrases included in the saved words list 324. Whereas, if the voice-based word recognition system determines that the spoken word or phrase detected may match a word or phrase in the saved words list 324, the voice-based word recognition system may be configured to autonomously prevent the word or phrase from being further transmitted via the browser application 308. When the end-user engages the protection switch 332 to switch the voice-based word recognition system into the Off state, the system may be configured to cease determining whether spoken words or phrases match the contents of the saved words list 324 and so on. Thus, while the voice-based word recognition system is in the OFF state, the end-user may speak and/or receive/transmit any words and phrases that are included in the saved words list 324 without being blocked.

Furthermore, the settings button 336 may be configured to enable the end-user to access various settings that control the operation of voice-based word recognition system (e.g., as shown below in FIG. 3B). In many embodiments, as shown in FIG. 3B, a second screenshot 301 may be configured to display the settings dialog box 344 in the browser application 308 in response to selecting the settings button 336 of FIG. 3A, such as by way of clicking with a mouse and/or the like. According to several embodiments illustrated in FIG. 3B, the settings dialog box 344 may comprise, but is not limited to, a saved words list 348 and a delete button 352 associated with each word or phrase included in the saved words list 348. The saved words list 348 includes all the words and phrases to be detected via the browser application 308. Further, the settings dialog box 344 may include a search box 356 configured to enable the end-user to locate a word or phrase in the saved words list 348. Any unwanted word or phrase may be removed from the saved words list 348 by selecting the delete button 352 associated with the unwanted word or phrase in the saved words list 348.

As will be appreciated, while the saved words list 324 of FIG. 3B may depict the words or phrases most recently added to the saved words list 324, the saved words list 348 of FIG. 3B may include all words and phrases that are to be detected via the browser application 308. Further, it should be understood that while the recognition system dialog box 304 facilitates entering individual words and phrases to be blocked, such as by typing in the new word text box 316, the settings dialog box 344 may comprise an import button 360 that enables entering groups of words and phrases to be detected. For example, the end-user may select the import button 360 and thereafter be displayed a file directory box 370 with various files in response to the import button 360 being selected. Based on this example, the end-user may then locate and select one or more external files 380 in the displayed file directory box 370, where each external file 380 contains a desired group of words and/or phrases to be detected via the browser application 308. In some embodiments, the settings dialog box 344 may be configured to receive a comma-separated values (CSV) file, such as the displayed external file 380 having CSV file extensions. As such, it is contemplated that any number of words and/or phrases may be grouped into a single CSV file by way of any spreadsheet program, without limitations.

Moreover, the settings dialog box 344 may include an export button 364 configured to enable the end-user to create a CSV file that may include a list of the words and phrases stored in the saved words list 348. It is contemplated that during operating the voice-based word recognition system, a growing number of words and phrases may be added to the saved words list 348 over time. As such, the end-user may periodically use the export button 364 to create a backup file that includes the current words and phrases included on the saved words list 348. Therefore, if a future occurrence arises in which the saved words list 348 needs to be restored, the end-user may simply select the import button 360 to load the words and phrases from the previously-stored backup file(s).

Figure 4:
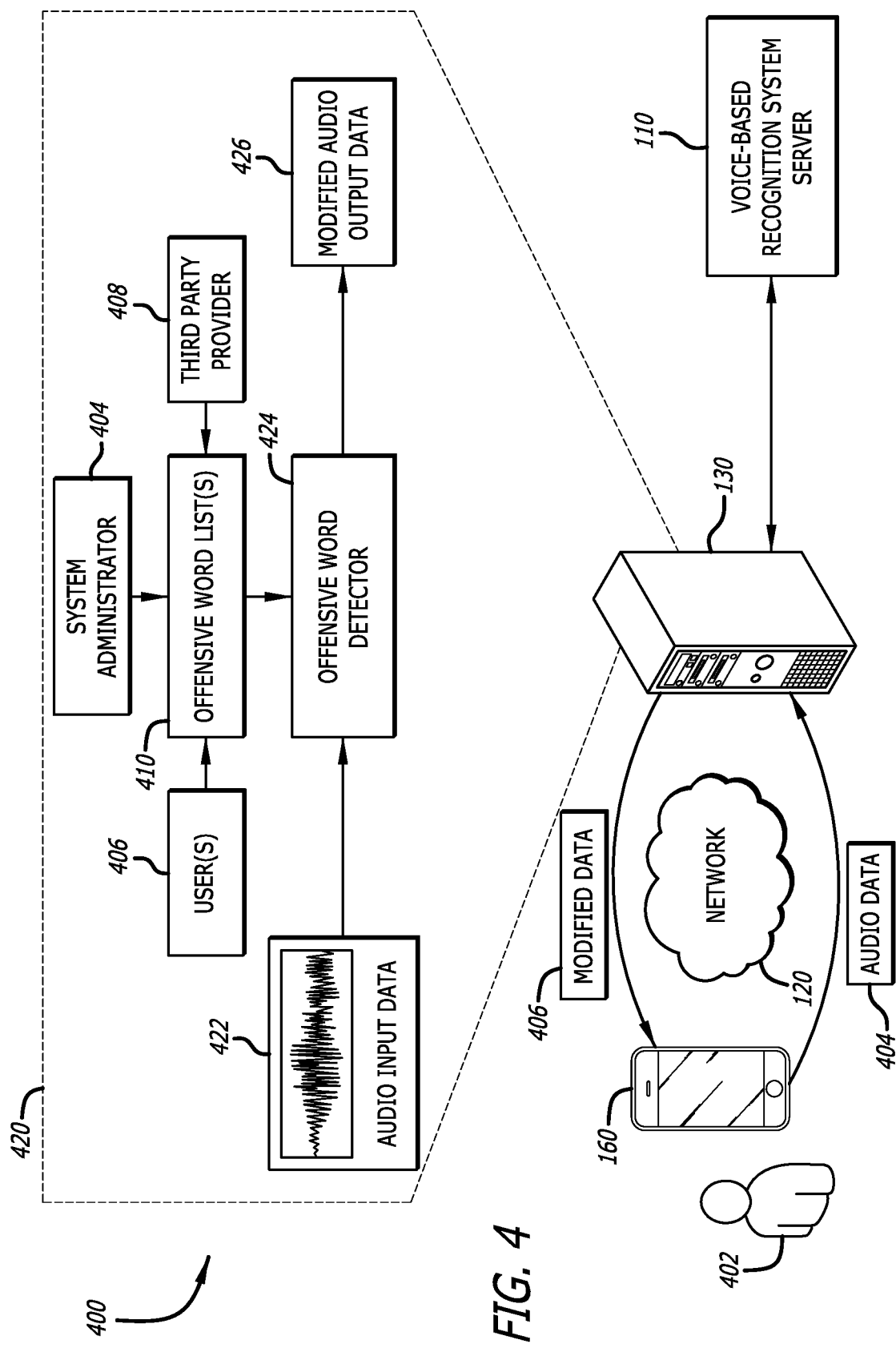
FIG. 4 is a block illustration of a voice-based word recognition system, in accordance with embodiments of the present disclosure.

Referring now to FIG. 4, an exemplary block illustration of an audio modification process flow 420 implemented with a voice-based word recognition system 400 is shown, in accordance with embodiments of the disclosure. It should be understood that the voice-based word recognition system 400 depicted in FIG. 4 may be substantially similar to the word recognition system 100 depicted in FIG. 1, without limitations. For example, as shown in FIG. 4, the voice-based word recognition system 400 may utilize several components depicted above in the word recognition system 100 to perform the illustrated audio modification process flow 420.

According to several embodiments depicted in FIG. 4, the voice-based word recognition system 400 may be configured to implement (or operate/perform) the illustrated process flow 420 comprising an audio input data block 422, an offensive word detector block 424, a modified audio output data block 426, and an offensive word list(s) block 410 generated with a system administrator block 404, a user(s) block 406, and a third-party provider block 408. In particular, the voice-based word recognition system 400 depicts an exemplary system for detecting and selectively modifying offensive words stored in a list of predetermined words. Furthermore, as shown in FIG. 4, the illustrated computing device 130 in conjunction with the voice-based word recognition system's server 110 may, in many embodiments, be configured to provide the audio input data 422 (or audio input samples) to the offensive word detector 424, which may respectively process the provided audio input data 422 to subsequently generate the modified audio output data 426.

In some embodiments, the voice-based word recognition system 400 may comprise a user 402, a mobile computing device 160, a network 120, the personal computing device 130 (or personal computer), and the voice-based recognition server 110. The mobile computing device 160, network 120, personal computing device 130, and voice-based recognition system server 110 depicted in FIG. 4 may be substantially similar to the mobile computing device 160, network 120, personal computing device 130, and voice-based recognition system server 110 depicted and described in great detail above in FIG. 1. In an embodiment, the user 402 may be a known user (or end-user) capable of using the mobile computing device 160 and/or the personal computing device 130.

In many embodiments, the illustrated system 400 may use the personal computing device 130 to receive audio data 404 (or audio signals) captured by the personal computing device 130. For example, in several embodiments, the personal computing device 130 cooperating with the voice-based recognition server 110 may be configured to receive the audio data 404 (or signal data) and process the received audio data 404 for one or more audio input data samples 422, which may then be provided to the offensive word detector 424. Additionally, in some embodiments, the personal computing device 130 in cooperation with the voice-based recognition system server 110 may be configured to provide the modified audio output data 426 generated by the offensive word detector 424, which may be transmitted back to the user 402 (or any other users) as modified data 406.

As described above, the modified audio output data 426 may be configured to modify one or more matched offensive words or phrases detected by the offensive word detector 424, such that the matched offensive words or phrases are thereby modified in the generated modified data 406 (or generated audio output data) being transmitted to one or more external users. For example, the modified audio output data 426 may be implemented such that the modified offensive words/phrases may have been (i) muted from the generated/transmitted modified data 406, (ii) bleeped out from the generated/transmitted modified data 406, and/or (iii) replaced from the generated/transmitted modified data 406 with one or more analogous non-offensive word or phrase recommended/suggested to the respective user 402.

Furthermore, as shown in FIG. 4, the offensive word detector 424 may be configured to identify offensive words in a string of words. For example, a string of one or more words for analysis may be provided as the audio input data 422 which is provided as input to the offensive word detector 424. The offensive word detector 424 is also associated with the offensive word list(s) 410 containing a list of words against which the audio input data 422 is to be compared. Based on the words/phrases from the audio input data 422 for analysis and the offensive word lists 404, the offensive word detector 424 may flag any particularly offensive words in the string of one or more words from the audio input data 422 for analysis that are considered likely to be offensive based on, e.g., the generated list of predetermined words 348 of FIG. 3B, where those flagged offensive words may be included in the generated/modified audio output data 426.

For example, using a collection of offensive words (e.g., profanity, obscenity, hate-speech, lewdness, sacrilege, blasphemy, subversive etc.) as one or more of the offensive word lists 404, which may have various "severity" scores assigned to them if desired.

Lastly, as described above, the contents of the offensive word list(s) 410 may be generated and come from a variety of sources, as shown with the illustrated process flow 420 depicted in FIG. 4. For example, the illustrated offensive word list 410 may be generated by a site administrator 404. The site administrator 404 (or other control personnel to whom the site administrator 304 delegates such responsibility) may identify a list of words that such admin deems offensive (e.g., that should not be permitted to appear on the admin's site and/or sites associated/administered by the admin), and utilize that list of words as the offensive word list 410 either alone or in conjunction with the offensive word detector 424. Moreover, the offensive word list 410 may also be generated by the one or more users 406 who may be associated or may be transmitted/presented the particular content. The user(s) 406 may identify words that they do not wish to hear (and/or view) while viewing the content, and those identified words may be presented to the offensive word identifier 424 as the generated offensive word list(s) 410.

The offensive word list 410 may also be provided by a third-party provider/source 408 (e.g., a source, entity, etc., other than the site administrator 404 and/or the users 406). The third-party provider 408 may identify a collection of words that are often deemed offensive. Such a list of words may be provided to the offensive word detector 424 as the generated offensive word lists 410. The offensive word lists 410 may also be generated by a collaborative effort of site administrators 404, users 406, third-party providers 408, and/or any other sources capable of being used with the offensive word detector 424. For example, the site administrator 404 may present a 'default' list of words that individual users may then customize for their own purposes. In another example, those individual users may also share the list of offensive words. In another example, the offensive word lists 410 may be created based upon a user's similarity to another group of users for which an offensive word list has been defined.

Figure 5A:
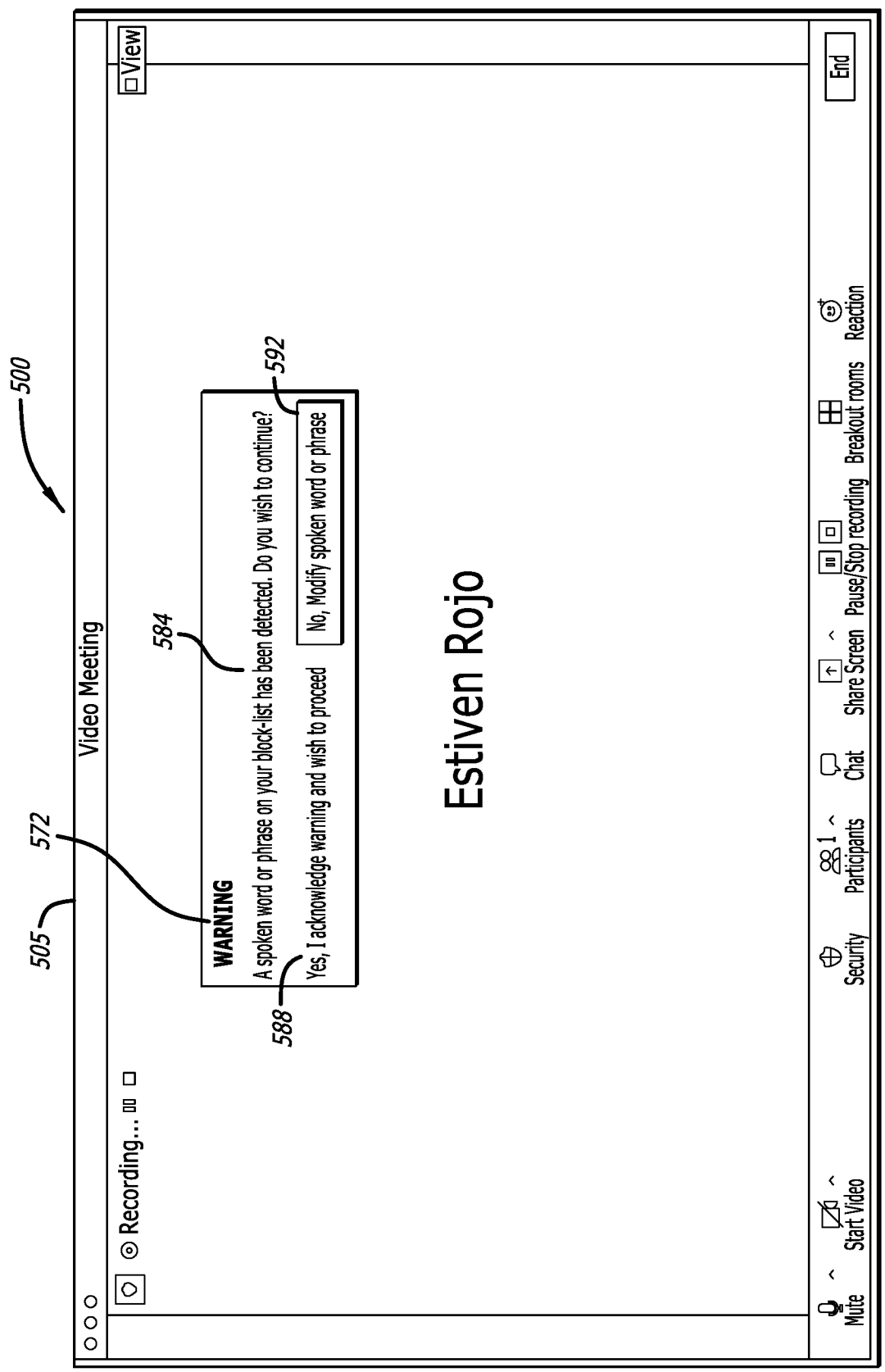
FIG. 5A is an exemplary screenshot illustration of a warning dialog box displayed in a cloud-based application, in accordance with embodiments of the present disclosure.
Figure 5B:
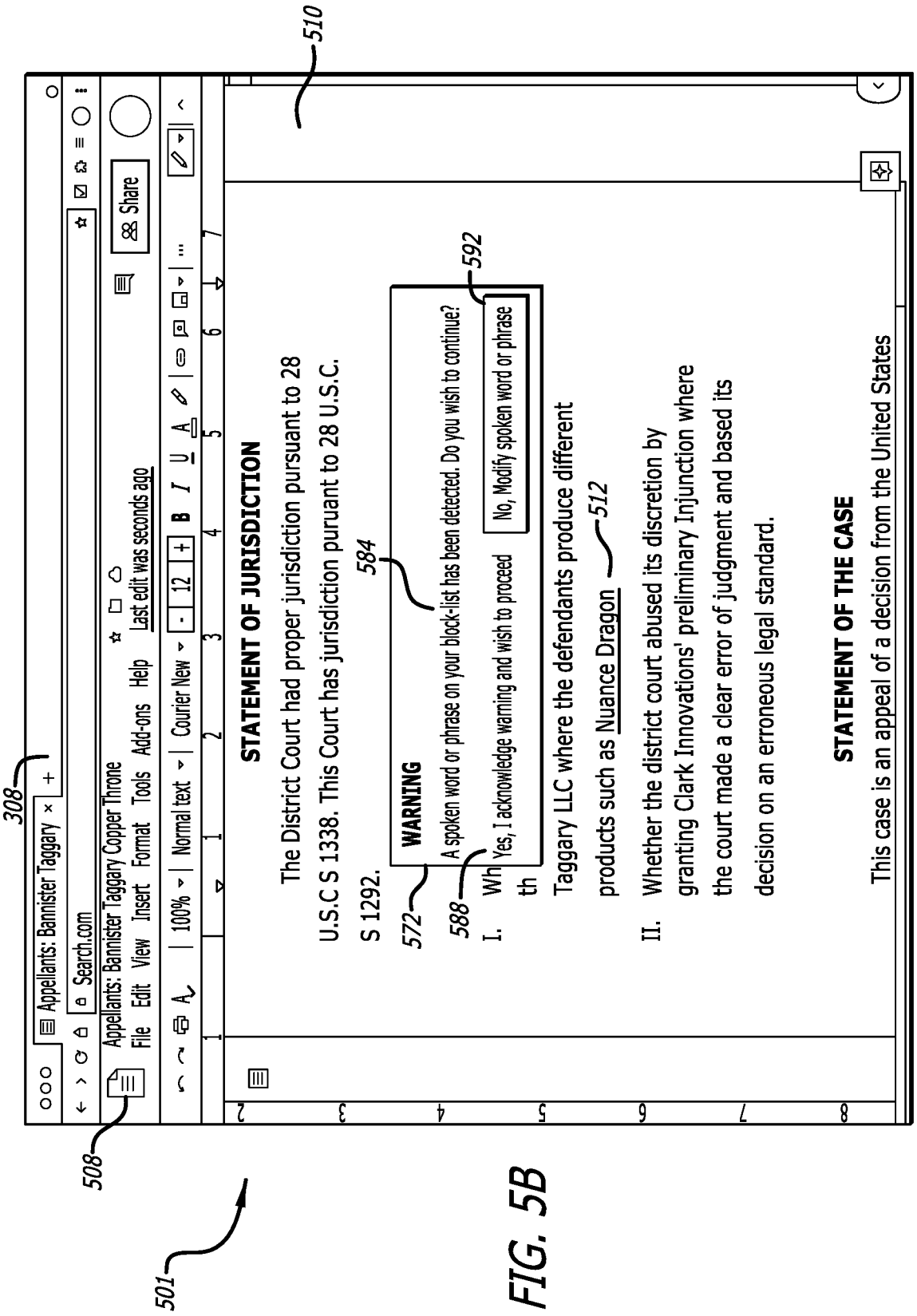
FIG. 5B is an exemplary screenshot illustration of a warning dialog box displayed in a web-based application, in accordance with embodiments of the present disclosure.
Figure 5C:
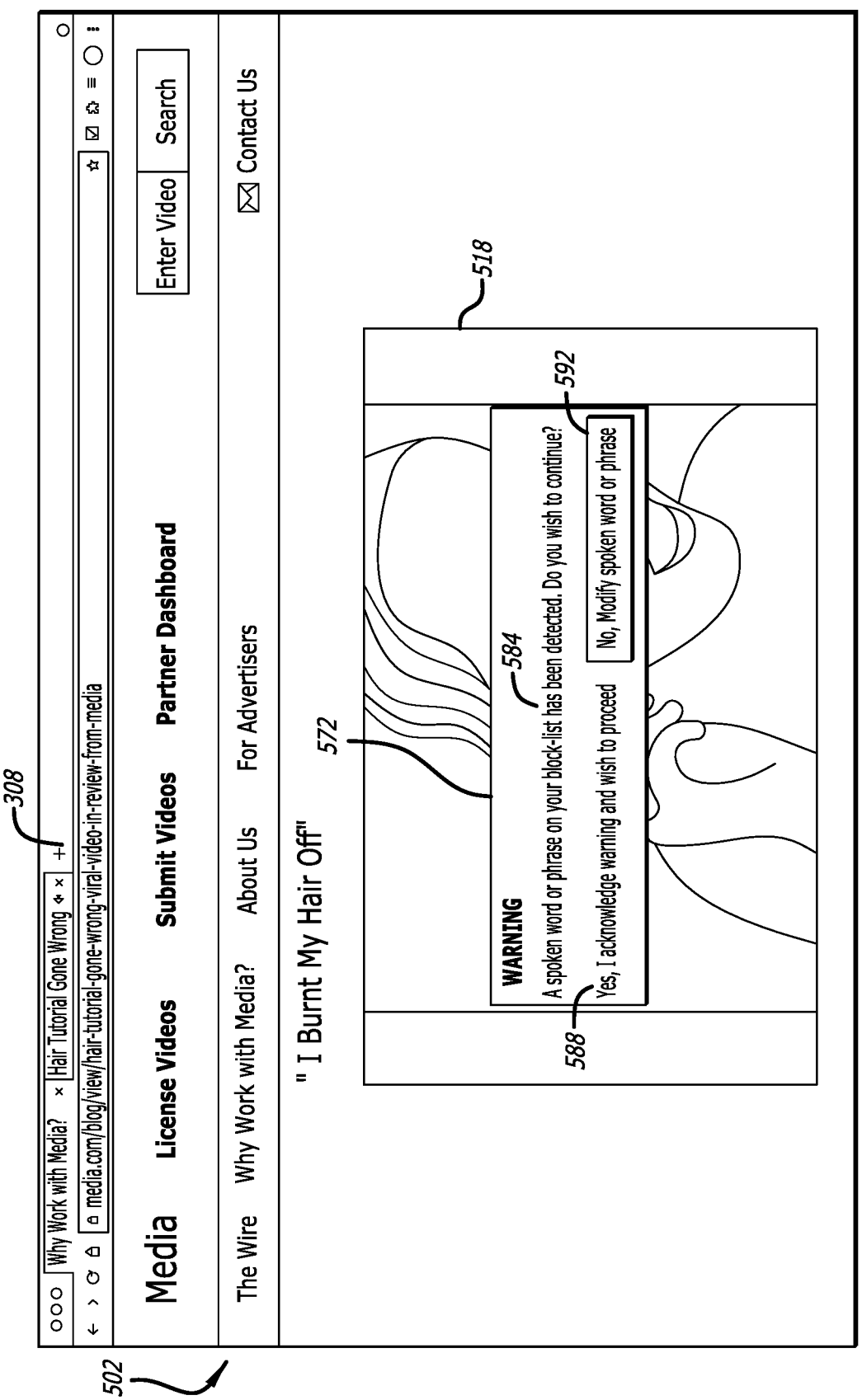
FIG. 5C is an exemplary screenshot illustration of a warning dialog box displayed in a video window being streamed in a browser application, in accordance with embodiments of the present disclosure.

Referring now to FIGS. 5A-C, a series of exemplary screenshot 500-502 illustrations of a warning dialog box 572 displayed in one or more respective applications 505 and 308 is shown, in accordance with embodiments of the disclosure. It should be understood that the illustrated screenshots 500-502 depicted in FIGS. 5A-C may be implemented with any of the voice-based word recognition server 110 depicted in FIG. 1, the personal computing device 130 depicted in FIG. 1, the voice-based word recognition computing device 200 depicted in FIG. 2, and/or the voice-based word recognition system 400 depicted in FIG. 4, without limitations. Also, although one or more illustrated components are explicitly depicted in FIGS. 5A-C, it should be understood that the exemplary screenshots 500-502 depicted in FIGS. 5A-C are not limited those illustrated components and may include more or less components capable of being implemented in any word recognition system described herein (e.g., the word recognition system 100 of FIG. 1), without limitations.

In many embodiments, as shown in FIG. 5A, the first screenshot 500 may be configured to display a warning dialog box 572 in a cloud-based application 505 and/or the like. In the illustrated embodiment, the cloud-based application 505 may be a video communications application for providing virtual video/audio teleconferences, webinars, interactive chats, tele-education, and so on. For example, the cloud-based application 505 may be a Zoom service and/or application (or Zoom-based services/applications), which may be an app-based application, a cloud-based application, a service-based application (e.g., SaaS), and so on. That said, as shown in FIG. 5A, the warning dialog box 572 depicted in the first screenshot 500 may include a warning message 584 in conjunction with one or more actionable buttons 588 and 584. However, in other embodiments, the warning dialog box 572 may be omitted such that the responsive action(s) may be automated (e.g., the sound of the modified offensive word or phrase may be elided and/or the like instead of providing the user with the warning dialog box 572 and having to manually select the actionable buttons 588 and 584.

As described above, when the word recognition system determines that a word or phrase being spoken (or having been spoken) matches a word or phrase in the saved words list 348, the recognition system prevents the spoken word or phrase from being further transmitted with the illustrated cloud-based application 505. For example, a Zoom-based application (or service) may be configured to modify the matched word or phrase in response to the respective end-user selecting the actionable button 592 (shown as the NO button in the displayed warning dialog box 572), such that the matched offensive word or phrase is thereby modified in the generated audio output data being transmitted to external users. In several embodiments, the modified offensive word or phrase comprises at least one or more of: (i) the matched offensive word or phrase being muted from the generated audio output data; (ii) the matched offensive word or phrase being bleeped out from the generated audio output data; and (iii) the matched offensive word or phrase being replaced from the generated audio output data with an analogous non-offensive word or phrase, where the analogous non-offensive word or phrase may be provided to the end-user as a recommendation about previous modifications, stored dictionaries, trained data, etc., which may be selected, revised, and/or disregarded.

In the example illustrated in FIG. 5A, one or more blocked and/or offensive words/phrase have been identified and captured by an I/O source associated with the illustrated cloud-based application 505. Before the blocked offensive words could be completely transmitted, however, the voice-based word recognition system may have been configured to lock the illustrated cloud-based application 505 and display the illustrated warning dialog box 572. Furthermore, as depicted in FIG. 5A, the warning dialog box 572 includes the displayed warning message 584 indicating that one or more spoken words or phrases from the saved words list 348 have been detected, and prompting the respective end-user to either: (i) acknowledge and proceed with the blocked/detected offensive words (as shown with the warning dialog box 572), and/or (ii) modify the blocked/detected offensive words and continue blocking the detected offensive words (as shown with the illustrated button 592). To this end, the warning dialog box 572 may be configured to display a Yes button 588 and a No button 592. Selecting the Yes button 588 enables the end-user to proceed with the transmission including the audio transmission of the detected offensive words, whereas selecting the No button 592 enables the end-user to modify the detected offensive words from being transmitted via the illustrated cloud-based application 505. It should be understood any of the word recognition systems, such as the word recognition system discussed in FIG. 5A, is not limited to detecting and selectively modifying words/phrases being transmitted via the cloud-based application 505 depicted in FIG. 5A, without limitation. That is, any of the word recognition systems described herein may be configured to detect and selectively modify any predetermined spoken words/phrases from being transmitted via any type of web-based applications (as shown with the web-based application 308 depicted in FIGS. 5B-C), native applications, and/or OS-based applications (e.g., Windows, iOS, Android, etc.), without limitations.

In other additional embodiments, as shown in FIG. 5B, the second screenshot 501 may be configured to display a warning dialog box 572 in a web-based application 308. In the illustrated embodiment, the web-based application 308 may be a web browser application such as a browser application for word processing and so on. For example, the illustrated application 308 may be any type of Word processing services and applications 508 (or Word-based services/applications), which may be configured to capture audio data with an I/O source, such as a dictation device or the like, that is respectively transcribed into a body box 510 of the Word processing service/application 508.

As shown in FIG. 5B, the warning dialog box 572 depicted in the second screenshot 501 may include a warning message 584 in conjunction with one or more actionable buttons 588 and 584. In this example, the illustrated second screenshot 501 may display the warning dialog box 572 in response to blocked words 512 (shown as "Nuance Dragon") having been dictated and transcribed into the body box 510 of the illustrated word processing document being operated through the web-based application 308. As discussed with respect to FIG. 5A, the warning dialog box 572 depicted in FIG. 5B may be trigged by the voice-based word recognition system in response to determine that a word or phrase being spoken (or having been spoken) matches a word or phrase in the saved words list 348. That is, the word recognition system prevents the spoken word or phrase from being further transcribed into the body box 510 of the illustrated application 308, where the spoken words/phrase depicted in this illustrated example includes words/phrases associated with proprietary information that should be blocked. As such, as described above, it should be understood that the detected spoken words/phrases are not limited to offensive words and may include any type of predetermined words that should be detected, blocked, and/or modified, without limitations. For example, the illustrated web-based application 308 may be configured to modify the matched word or phrase in response to the respective end-user selecting the actionable button 592 (shown as the NO button in the displayed warning dialog box 572), such that the detected proprietary words/phrase is thereby modified within the body box 510 from the final version of the word processing document being transmitted to external users. As such, the end-user may select a Yes button 588 to continue dictating and transcribing (or typing) the blocked words 512 or select a No button 592 to remove the block words 512 from the body box 510 of the Word processing document window 508.

Furthermore, in several embodiments, as shown in FIG. 5C, the third screenshot 502 may be configured to display a warning dialog box 572 in a web-based application 308. In these embodiments, the web-based application 308 depicted in FIG. 5C may be similar to the web-based application 308 depicted in FIG. 5B, with the exception that the illustrated application 308 in FIG. 5C includes a video streaming window 518. In the illustrated embodiment, the video streaming window 518 may be a multimedia display area for transmitting and streaming videos, podcasts, and so on (e.g., the streaming window 518 may be implemented to operate with YouTube or the like). Accordingly, in the example shown in FIG. 5C, the illustrated third screenshot 503 may the displayed warning dialog box 572 in response to blocked words/phrases having been detected by an external end-user being streamed (or transmitted) in the illustrated window 518. As such, it should be understood that the voice-based word recognition system described herein has been implemented to block the spoken words/phrases from being further transmitted as well as temporarily blocking (or stopping) the streamed/transmitted video being displayed in the illustrated window 518, without limitations.

Figure 6:
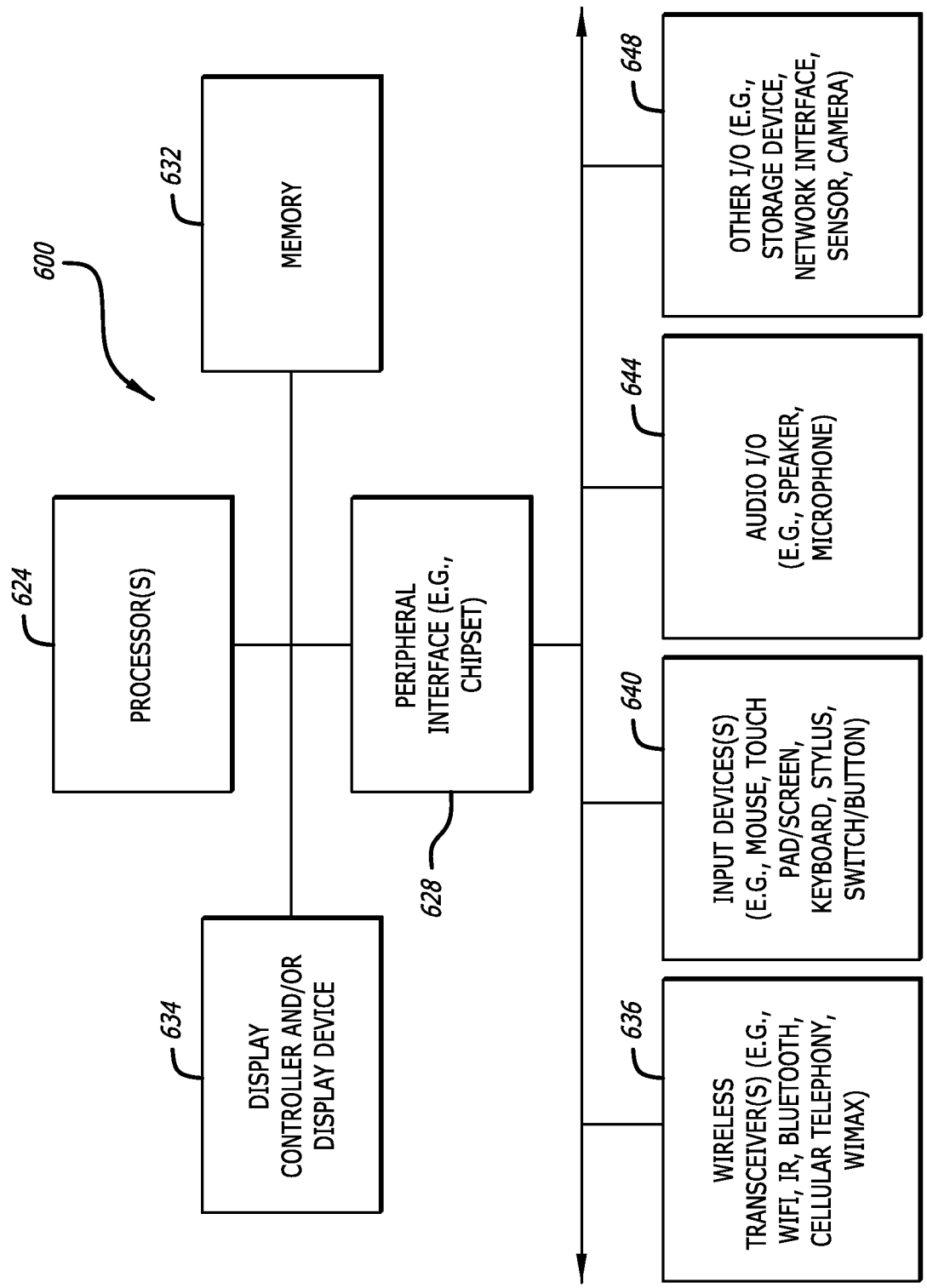
FIG. 6 is an exemplary block illustration of a data processing system that may be used in conjunction with a voice-based word recognition computing device/system in accordance with various embodiments of the present disclosure.

Referring now to FIG. 6, an exemplary block illustration of a data processing system 600 is shown, in accordance with embodiments of the disclosure. It should be understood that the data processing system 600 depicted in FIG. 6 may be implemented similar to the personal computing device 130 depicted in FIG. 1 and/or the voice-based recognition computing device 200 depicted in FIG. 2, without limitations. As shown in FIG. 6, the data processing system 600 may be implemented in conjunction with a word recognition system (e.g., the word recognition system 100 of FIG. 1) to perform any of the processes or methods described herein. System 620 may represent a desktop, a tablet, a server, a mobile phone, a personal digital assistant (PDA), a personal communicator, a network router or hub, a wireless access point (AP) or repeater, a set-top box, or a combination thereof.

In an embodiment, illustrated in FIG. 6, system 620 includes a processor 624 and a peripheral interface 628, also referred to herein as a chipset, to couple various components to the processor 624, including a memory 632 and devices 636-648 via a bus or an interconnect. Processor 624 may represent a single processor or multiple processors with a single processor core or multiple processor cores included therein. Processor 624 may represent one or more general-purpose processors such as a microprocessor, a central processing unit (CPU), or the like. More particularly, processor 624 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 624 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 624 may be configured to execute instructions for performing the operations and steps discussed herein.

Peripheral interface 628 may include a memory control hub (MCH) and an input output control hub (ICH). Peripheral interface 628 may include a memory controller (not shown) that communicates with a memory 632. The peripheral interface 628 may also include a graphics interface that communicates with graphics device 634, which may include a display controller and/or a display device. The peripheral interface 628 may communicate with the graphics device 634 by way of an accelerated graphics port (AGP), a peripheral component interconnect (PCI) express bus, or any other type of interconnects.

An MCH is sometimes referred to as a Northbridge, and an ICH is sometimes referred to as a Southbridge. As used herein, the terms MCH, ICH, Northbridge and Southbridge are intended to be interpreted broadly to cover various chips that perform functions including passing interrupt signals toward a processor. In some embodiments, the MCH may be integrated with the processor 624. In such a configuration, the peripheral interface 628 operates as an interface chip performing some functions of the MCH and ICH. Furthermore, a graphics accelerator may be integrated within the MCH or the processor 624.

Memory 632 may include one or more volatile storage (or memory) devices, such as random access memory (RAM), dynamic RAM (DRAM), synchronous DRAM (SDRAM), static RAM (SRAM), or other types of storage devices. Memory 632 may store information including sequences of instructions that are executed by the processor 624, or any other device. For example, executable code and/or data of a variety of operating systems, device drivers, firmware (e.g., input output basic system or BIOS), and/or applications can be loaded in memory 632 and executed by the processor 624. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 628 may provide an interface to IO devices, such as the devices 636-648, including wireless transceiver(s) 636, input device(s) 640, audio IO device(s) 644, and other IO devices 648. Wireless transceiver 636 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 640 may include a mouse, a touch pad, a touch sensitive screen (which may be integrated with display device 634), a pointer device such as a stylus, and/or a keyboard (e.g., physical keyboard or a virtual keyboard displayed as part of a touch sensitive screen). For example, the input device 640 may include a touch screen controller coupled with a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio I/O 644 may include a speaker and/or a microphone to facilitate voice-enabled functions, such as voice recognition, voice replication, digital recording, and/or telephony functions. The audio I/O 644 may also comprise any other similar I/O sources capable of receiving and transmitting audio signals and/or the like. Other optional devices 648 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 648 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that, although FIG. 6 illustrates various components of a data processing system, it is not intended to represent any particular architecture or manner of interconnecting the components; as such details are not germane to embodiments of the present disclosure. It should also be appreciated that network computers, handheld computers, mobile phones, and other data processing systems, which have fewer components or perhaps more components, may also be used with embodiments of the invention disclosed hereinabove.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it should be appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g., circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A voice-based word recognition system for detecting and selectively modifying offensive words spoken by users, comprising:
    an input/output (I/O) source;
    one or more processors communicatively coupled to the I/O source; and
    a memory communicatively coupled to the one or more processors, the memory comprising:
    a monitoring logic configured to receive signal data from the I/O source wherein the signal data comprises audio data captured with the I/O source, and wherein the captured audio data is associated with one or more words or phrases spoken by one or more users;
    a word detector logic configured to identify a potentially offensive word or phrase from the received signal data;
    an analyzer logic configured to determine whether the identified potentially offensive word or phrase matches an offensive word or phrase from a list of predetermined words wherein the list of predetermined words is generated based on one or more sources, and wherein the one or more sources comprises at least one or more of a system administrator, a third-party provider, an entity, a service, and the one or more users wherein the generated list of predetermined words comprises at least one or more of a set of offensive words, a set of proprietary words, a set of inappropriate words, a set of age-restricted words, and a set of flagged words and further wherein the generated list of predetermined words is implemented with a word recognition dialog box, and wherein the word recognition dialog box is configured to display an abridged wordlist window and a plurality of controls;

the displayed controls are configured to enable the one or more users to administer the generated list of predetermined words, and wherein the displayed controls comprise an add button, a delete icon, a protection switch, and a settings button wherein the add button is configured to insert one or more new words to the generated list of predetermined words, wherein the abridged wordlist window is configured to display a recent list of the one or more inserted new words, wherein the delete icon is configured to remove one or more outdated words from the generated list of predetermined words, and wherein the protection switch is configured to allow the one or more users to switch the voice-based word recognition system between an ON state and an OFF state; and an alert logic configured to generate alert data in response to the identified potentially offensive word or phrase matching the offensive word or phrase from the list of predetermined words.

2. The voice-based word recognition system of claim 1, wherein the settings button is configured to display a settings dialog box, and wherein the settings dialog box comprises an extended wordlist window, a search box, an import button, and an export button.

3. The voice-based word recognition system of claim 1 wherein the extended wordlist window is configured to display each word available in the generated list of predetermined words, wherein the search box is configured to locate one or more words in the generated list of predetermined words, wherein the import button is configured to import a first string of specified offensive words from a first external source to supplement the generated list of predetermined words, and wherein the export button is configured to generate a second string of specified offensive words from the generated list of predetermined words and to transmit the generated second string of specified offensive words to a second external source.

4. The voice-based word recognition system of claim 1, wherein, in response to the generated alert data, the alert logic is configured to trigger one or more autonomous response actions based on the matched offensive word or phrase from the generated list of predetermined words.

5. The voice-based word recognition system of claim 1, further comprising:
a user interface logic configured to provide a plurality of word recognition tools and customizable prompts used to facilitate the one or more users with administering the generated list of predetermined word, wherein the user interface logic is configured to cooperate with the alert logic to display a warning dialog box in response to the one or more triggered autonomous response actions.

6. The voice-based word recognition system of claim 1, wherein the displayed warning dialog box is configured to prevent the matched offensive word or phrase from being generated and transmitted as audio output data, wherein the displayed warning dialog box is configured to display a warning message in conjunction with one or more actionable buttons relating to the matched offensive word or phrase, and wherein the displayed actionable buttons are configured to prompt the users to select between: (i) a NO button configured to acknowledge and proceed in light of the displayed warning message, or (ii) a YES button configured to modify the matched offensive word or phrase prior to generating and transmitting the audio output data.

7. The voice-based word recognition system of claim 1, further comprising:
a modification logic configured to modify the matched offensive word or phrase in response to the users selecting the YES button in the displayed warning dialog box, such that the matched offensive word or phrase is thereby modified in the generated audio output data being transmitted to one or more external users, wherein the modified offensive word or phrase comprises at least one or more of: (i) the matched offensive word or phrase being muted from the generated audio output data, (ii) the matched offensive word or phrase being bleeped out from the generated audio output data, and (iii) the matched offensive word or phrase being replaced from the generated audio output data with an analogous non-offensive word or phrase;
a machine learning logic configured to cooperate with one or more of the word detector logic, the analyzer logic, and the alert logic to generate supplemental analysis data based on the modified offensive word or phrase, the matched offensive word or phrase, and the words or phrases spoken by users, wherein the generated supplemental analysis data is thereby utilized to train machine learning data, and wherein the trained machine learning data is configured to better identify data within the captured audio data in conjunction with better modify data based on past selections, modifications, and user feedback; and
a report logic configured to generate a customizable report relating to any of the detected and selectively modified offensive words spoken by the users.

* * * * *